(12) United States Patent
Dolmazon et al.

(10) Patent No.: US 9,102,767 B2
(45) Date of Patent: Aug. 11, 2015

(54) LOW MOLECULAR WEIGHT (METH)ACRYLIC POLYMERS, FREE OF SULPHUR-CONTAINING, METALLIC AND HALOGENATED COMPOUNDS AND WITH LOW RESIDUAL MONOMER CONTENT, METHOD FOR PREPARING THE SAME AND USES THEREOF

(75) Inventors: Nelly Dolmazon, Serezin (FR); José Santiago, Limony (FR); Yvan Storet, Sérézin de la Tour (FR); Frédéric Tort, Brignais (FR)

(73) Assignee: TOTAL RAFFINAGE MARKETING, Puteaux (FR)

( * ) Notice: Subject to any disclaimer, the term of this patent is extended or adjusted under 35 U.S.C. 154(b) by 536 days.

(21) Appl. No.: 13/259,820

(22) PCT Filed: Mar. 25, 2010

(86) PCT No.: PCT/FR2010/050544
§ 371 (c)(1),
(2), (4) Date: Sep. 23, 2011

(87) PCT Pub. No.: WO2010/109144
PCT Pub. Date: Sep. 30, 2010

(65) Prior Publication Data
US 2012/0077721 A1   Mar. 29, 2012

(30) Foreign Application Priority Data
Mar. 25, 2009  (FR) ...................................... 09 01397

(51) Int. Cl.
| C10M 145/14 | (2006.01) |
| C10L 1/196  | (2006.01) |
| C08F 2/06   | (2006.01) |
| C08F 220/18 | (2006.01) |
| C10L 1/14   | (2006.01) |
| C10L 10/14  | (2006.01) |
| C10L 1/16   | (2006.01) |
| C10L 1/197  | (2006.01) |
| C10L 1/236  | (2006.01) |

(52) U.S. Cl.
CPC ............... *C08F 2/06* (2013.01); *C08F 220/18* (2013.01); *C10L 1/143* (2013.01); *C10L 1/1963* (2013.01); *C10L 10/14* (2013.01); *C10M 145/14* (2013.01); *C10L 1/1616* (2013.01); *C10L 1/1973* (2013.01); *C10L 1/2364* (2013.01); *C10M 2209/084* (2013.01); *C10N 2220/021* (2013.01); *C10N 2220/023* (2013.01); *C10N 2230/02* (2013.01)

(58) Field of Classification Search
CPC ........... C10M 2209/084; C10L 1/1966; C10L 2200/0254
USPC .......... 508/469; 44/388, 389, 397; 526/317.7, 526/328, 329.7
See application file for complete search history.

(56) References Cited

U.S. PATENT DOCUMENTS

| 3,028,367 A | 4/1962 | O'Brien |
| 3,627,838 A | 12/1971 | Ilnyckyj et al. |
| 4,056,559 A | 11/1977 | Lewis et al. |
| 4,117,235 A | 9/1978 | Taylor |
| 4,301,266 A | 11/1981 | Muenster et al. |
| 4,359,325 A | 11/1982 | Dawans et al. |
| 4,511,369 A | 4/1985 | Denis et al. |
| 4,652,273 A | 3/1987 | Maldonado et al. |
| 4,652,605 A | 3/1987 | Chang et al. |
| 4,664,676 A | 5/1987 | Denis et al. |
| 4,731,095 A | 3/1988 | Garapon et al. |
| 4,900,332 A | 2/1990 | Denis et al. |
| 5,001,202 A | 3/1991 | Denis et al. |
| 5,032,298 A | 7/1991 | Roque et al. |
| 5,106,515 A | 4/1992 | Denis et al. |
| 5,256,740 A | 10/1993 | Denis et al. |
| 5,449,386 A | 9/1995 | Denis et al. |
| 5,475,073 A | 12/1995 | Guo |
| 5,480,943 A | 1/1996 | Guo |
| 5,721,201 A | 2/1998 | Tomassen et al. |
| 5,730,029 A | 3/1998 | Stoldt et al. |
| 5,863,303 A | 1/1999 | Yamamoto et al. |
| 5,998,530 A | 12/1999 | Krull et al. |
| 6,071,318 A | 6/2000 | Mallet et al. |
| 6,083,287 A | 7/2000 | Germanaud et al. |
| 6,362,296 B1 | 3/2002 | Singhal et al. |
| 6,509,424 B1 | 1/2003 | Krull et al. |
| 6,511,520 B1 | 1/2003 | Eber et al. |
| 6,552,141 B1 * | 4/2003 | Chmelir et al. ................ 526/217 |
| 6,844,406 B2 | 1/2005 | Mazza et al. |
| 6,878,776 B1 | 4/2005 | Pascault et al. |
| 6,998,447 B2 * | 2/2006 | Irie et al. .................... 525/330.2 |
| 7,238,743 B2 * | 7/2007 | Matsumoto et al. .......... 524/556 |
| 7,374,589 B2 | 5/2008 | Bernasconi et al. |
| 7,470,757 B2 | 12/2008 | Miserque et al. |
| 7,629,428 B2 * | 12/2009 | Daniel et al. ................ 526/317.1 |
| 7,645,842 B2 * | 1/2010 | Acker et al. ..................... 526/86 |
| 7,838,599 B2 | 11/2010 | Zöllner et al. |
| 7,973,095 B2 * | 7/2011 | Herth et al. ........................ 522/4 |

(Continued)

FOREIGN PATENT DOCUMENTS

| EP | 0 007 590 | 2/1980 |
| EP | 0 261 959 | 3/1988 |

(Continued)

*Primary Examiner* — Ellen McAvoy
(74) *Attorney, Agent, or Firm* — Harness, Dickey & Pierce, P.L.C.

(57) ABSTRACT

The subject of the disclosure concerns C8 or higher, linear or branched fatty chain (meth)acrylic polymers possibly containing at least one ethylene unsaturation, having a weight average molecular weight $\overline{Mw}$ of less than 20,000 g/mole, free of sulphur-containing, metallic and halogenated compounds and with a residual monomer content measured by GPC of no more than 10% by weight, preferably no more than 7% by weight. A further subject of the disclosure is the synthesis method and the uses of these polymers.

15 Claims, No Drawings

(56) References Cited

U.S. PATENT DOCUMENTS

| | | | |
|---|---|---|---|
| 8,084,561 B2 * | 12/2011 | Kim et al. | 526/219.5 |
| 2005/0223631 A1 | 10/2005 | Jackson | |
| 2008/0027179 A1 | 1/2008 | Zollner et al. | |
| 2010/0058653 A1 | 3/2010 | Dolmazon et al. | |
| 2010/0144569 A1 * | 6/2010 | Placek et al. | 508/440 |
| 2010/0167970 A1 * | 7/2010 | Stoehr et al. | 508/469 |
| 2010/0190894 A1 | 7/2010 | Chaverot et al. | |
| 2010/0192804 A1 | 8/2010 | Lapalu et al. | |
| 2010/0197835 A1 | 8/2010 | Chaverot et al. | |
| 2010/0251606 A1 | 10/2010 | Tort et al. | |
| 2010/0275508 A1 | 11/2010 | Dolmazon et al. | |
| 2011/0144242 A1 | 6/2011 | Chaverot et al. | |
| 2011/0177989 A1 | 7/2011 | Bouffet | |
| 2011/0178258 A1 | 7/2011 | El Kadib et al. | |

FOREIGN PATENT DOCUMENTS

| | | |
|---|---|---|
| EP | 0271 385 | 6/1988 |
| EP | 0 736 590 | 10/1996 |
| FR | 2 528 051 | 12/1983 |
| FR | 2 528 423 | 12/1983 |
| FR | 2 772 783 | 6/1999 |
| FR | 2 903 410 | 1/2008 |
| JP | 06211942 | 8/1994 |
| JP | 2009263622 A | 11/2009 |
| WO | WO 92/15623 | 9/1992 |
| WO | WO 93/14178 | 7/1993 |
| WO | WO 94/06894 | 3/1994 |
| WO | WO 94/13758 | 6/1994 |
| WO | WO 94/17160 | 8/1994 |
| WO | WO 98/04656 | 2/1998 |
| WO | WO 2008/006965 | 1/2008 |
| WO | WO 2008/006998 | 1/2008 |

* cited by examiner

LOW MOLECULAR WEIGHT (METH)ACRYLIC POLYMERS, FREE OF SULPHUR-CONTAINING, METALLIC AND HALOGENATED COMPOUNDS AND WITH LOW RESIDUAL MONOMER CONTENT, METHOD FOR PREPARING THE SAME AND USES THEREOF

CROSS-REFERENCE TO RELATED APPLICATIONS

This application is a National Phase Entry of International Application No. PCT/FR2010/050544, filed on Mar. 25, 2010, which claims priority to French Patent Application Serial No. 09/01397, filed on Mar. 25, 2009, both of which are incorporated by reference herein.

TECHNICAL FIELD

The present invention concerns (meth)acrylic polymers. Its subject more particularly relates to (meth)acrylic polymers with $C_8$ or higher, linear or branched fatty chain (meth)acrylic polymers possibly containing ethylene unsaturations, of low molecular weight, free of sulphur-containing, metallic and halogenated compounds and with low residual monomer content. A further subject of the invention is a method using radical polymerization in solution for preparing $C_8$ or higher, linear or branched fatty chain (meth)acrylic polymers possibly containing ethylene unsaturations, of low molecular weight and free of sulphur-containing, metallic and halogenated compounds. The invention also concerns the use of these polymers in formulations which can be used in different application sectors such as solvated acrylic resins with high dry extract, or oil additives and lubricants in particular. By (meth)acyrlic polymers in the present application is meant alkyl polyacrylates and/or polymethacrylates.

BACKGROUND

In the field of (meth)acrylic polymers, the radical polymerization of (meth)acrylic monomers in a solvent medium is one of the routes conventionally used. Polymerization is initiated using compounds generating free radicals such as organic peroxides or nitrous compounds which, depending on cases, may or may not be combined with decomposition accelerators as is the case in particular in oxidation-reducing initiator systems also known as "redox". In radical polymerization, the length of the kinetic chain γ of the polymers is based on the expression: kp [M]

$Y=2(f\,kd\,kt\,[I])^{1/2}$ where:

kp: rate constant of propagation; [M]: monomer concentration; f: initiator efficiency factor; kd: rate constant of initiator decomposition; kt: rate constant of termination; [I]: initiator concentration.

The weight average molecular weights of the polymers, obtained using this method, are relatively high, generally higher than 50,000 g/mole. However it may be necessary to provide polymers having a lower molecular weight, in particular for reasons of efficiency in some industrial applications or to meet environmental constraints as is the case in the area of coatings containing solvated acrylic reins. In this case, the use of low molecular weight resins effectively allows the dry extract of the solvated formulations to be increased without modifying the viscosity thereof, which helps towards reducing the content of volatile organic compounds.

Some applications of (meth)acrylic polymers also require that they should be free of impurities which may generate problems of odour or colour change such as sulphur-containing compounds, and that they should be free of metals or halogens. The synthesis of low molecular weight (meth) acrylic polymers in solvent medium raises known problems in the state of the art and numerous alternatives have already been developed for the purpose of limiting molecular weights.

For example the very high temperature thermal polymerization described for example in U.S. Pat. Nos. 6,844,406 and 4,117,235, allows a large number of radicals to be generated by accelerating the decomposition kinetics of the initiator whilst increasing the probable occurrence of transfer reactions. This gives polymers of lower molecular weight having reduced viscosity in solution. However, this process applying a temperature generally of between 150 and 250° C., sometimes higher than 300° C., is limited to the use of solvents with high boiling point and not only entails the use of high concentrations of initiator but also high energy costs.

In U.S. Pat. No. 4,652,605 relating to the preparation of vinyl polymers of low molecular weight, the control over the length of the kinetic chain is ensured by adding a high concentration of initiator. Polymerization under dilute reaction conditions also allows a reduction in the probable occurrence of propagation reactions and thereby contributes towards obtaining low molecular weights. Industrially, this method is not economic however on account of the high cost of the initiators generally used and the low polymer productivity thereof.

In U.S. Pat. No. 4,056,559, methacrylic esters of weight average molecular weight of between 400 and 10,000 are prepared by anionic polymerization in the presence of an alkoxide anion as catalyst and an alcohol which acts as chain regulating agent, the control over molecular weight being achieved through the ratio between the total quantity of alcohol used and the monomer charge. The catalyst, such as sodium methoxide can be neutralized after the reaction using a mineral acid such as hydrochloric acid, and a polar organic solvent such as dimethylsulphoxide can be used to improve the solubility and efficacy of the catalyst. It is therefore not excluded that the polymers thus obtained contain traces of halogen or sulphur compound.

Another route very widely used to limit the molecular weights of polymers obtained by radical polymerization is the use of a chain transfer agent. The role of this agent is to limit the lengths of polymer chains through the early terminating of the active growth centres. The chain transfer agent may be the monomer itself, as is the case for allylic monomers, or the solvent particularly if it is a protic solvent such as isopropanol used in the process described in document U.S. Pat. No. 4,301,266. Industrially, the most frequently used chain transfer agents are sulphur-containing agents such as alkyl mercaptans and in particular lauryl mercaptan (FR 2,604,712, U.S. Pat. No. 3,028,367). While their high transfer constants make these the compounds of choice for efficient control over molecular weights, these compounds have the disadvantage however of leading to odorous polymers liable to colour-change problems in storage. They are also incompatible with applications in which sulphur is prohibited. Other so-called controlled radical polymerization techniques also allow the molecular weights of the polymer chains to be limited. Among these mention may be made of nitroxide mediated polymerization. (NMP), polymerization initiated by species acting simultaneously as transfer agent, polymerization in the presence of organometallic compounds or polymerization processes by atom transfer (ATRP/RAFT) which have recourse to sulphur- or halogen-containing molecules. These processes have various shortcomings however such as difficult implementation, use of compounds possibly leading to the presence of undesirable impurities such as sulphur-containing, metallic or halogenated compounds, and a high cost.

Document U.S. Pat. No. 5,475,073 describes a method for preparing hydroxy-functionalized acrylic resins in which an allylic alcohol acts both as solvent and as transfer agent, and the initiator is partly added by continuous addition throughout polymerization. The resins have a number average molecular weight ranging from about 500 to about 10,000 g/mole.

The article Paint India 53 (8) (August 2003) by Asian PPG, pages 33-46, describes a novel route for synthesizing low molecular weight acrylic resins, based on adding the initiator to the reactor either in part or in full before adding the monomers. The monomers are a mixture of acrylic acid, methyl methacrylate, 2-ethyl hexyl acrylate, hydroxy ethyl methacrylate and styrene. The peroxide of di tert-butyl (DTBP) is used as initiator and o-xylene as solvent. The polymerization temperature is 132° C. The weight average molecular weights of the resins obtained are between 18,000 and 30,000 g/mole.

WO 2008/006998 describes (meth)acrylic polymers of low molecular weight ($\overline{Mw}$ lower than 20,000 g/mole) which are prepared by radical polymerization in solution, the entirety of the radical initiator being added as starter to the reactor vessel before continuously adding the monomers in the presence of a decomposition accelerator. However, it has been ascertained that with this preparation method the level of residual monomers is high (more than 18% even up to 20%, hence one fifth of the monomers used which are not polymerized) which is detrimental for envisaged applications such as the use as additives in oil, hydrocarbon, lubricant formulations.

In WO 2008/006965 the use of a homopolymer is described in hydrocarbon distillates having a boiling point of between 150 and 450° C., the homopolymer being obtained from $C_3$-$C_{12}$ olefin esters of carboxylic acid and a fatty alcohol comprising a chain of more than 16 carbon atoms and optionally an olefin bond, for enhancing the efficiency of filterability additives added to the said distillates containing a co- and/or terpolymer of ethylene, $C_3$-$C_5$ carboxylic acid vinyl ester and a mono-alcohol comprising 1 to 10 carbon atoms. These homopolymers were prepared following the operating mode described in WO 2008/006968 (cf. page 13, lines 7-17).

SUMMARY

Methacrylic polymers of low molecular weight have now surprisingly been found that are free of sulphur-containing, metallic and halogenated compounds and have low residual monomer content; in general the residual monomers do not represent more than 10% by weight of the monomers used for the polymerization reaction. These low molecular weight polymers may, in particular, be obtained by radical polymerization in a solvent medium using a very fast initiating system consisting of adding the entirety of the monomers to the reactor before continuously adding at least one radical initiator (hereinafter called radical initiator). For a given monomer concentration, the rapid generation in the polymerization medium of a very large number of radicals allows the kinetic chain length of the growth chains to be limited, and thereby gives access to very low molecular weights.

Optionally, the initiator may also be combined with a decomposition accelerator for the purpose of further accelerating the kinetics of free radical generation in the medium, thereby increasing the concentration thereof by combining a thermal decomposition mechanism with a redox decomposition mechanism. The non-use of a transfer agent and of any controlled radical polymerization technique lead to polymers free of sulphur-containing, metallic or halogenated compounds. By sulphur-containing compounds is meant all molecules comprising in their chain at least one sulphur atom. Similarly a compound is said to be metallic or halogenated if it comprises in its chain at least metal atom such as Fe, Co, Ni, Sn, Cr, Ti, this list not being exhaustive, or at least one halogen atom such as Cl, Br, F, I. The subject of the present invention is therefore $C_8$ or higher, linear or branched fatty chain (meth)acrylic polymers possibly containing at least one ethylene unsaturation, of weight average molecular weight $\overline{Mw}$ less than 20,000 g/mole, free of sulphur-containing, metallic or halogenated compounds and with low residual monomer content.

A further subject of the invention is a method for synthesizing $C_8$ or higher (meth)acrylic polymers with linear or branched fatty chain possibly containing at least one ethylene unsaturation, of weight average molecular weight $\overline{Mw}$ less than 20,000 g/mole, free of sulphur-containing, metallic or halogenated compounds and with low residual monomer content, by radical polymerization in solution, characterized in that initially a starter is placed in the reactor composed of the entirety of the $C_8$ or higher, linear or branched fatty chain (meth)acrylic monomer(s) which may contain at least one ethylene unsaturation, after which the radical initiator is added continuously and in general in solution in an organic solvent. A further subject of the invention is the use of $C_8$ or higher, linear or branched fatty chain (meth)acrylic polymers possibly containing at least one ethylene unsaturation, of weight average molecular weight less than 20,000 g/mole, free of sulphur-containing, metallic or halogenated compounds and with low residual monomer content, as additives in formulations of solvated acrylic resins with high dry extract, or in oil formations such as lubricant formulations. Other characteristics and advantages of the invention will become better apparent on reading the following description.

DETAILED DESCRIPTION

The $C_8$ or higher, linear or branched fatty chain (meth)acrylic polymers possibly containing at least one ethylene unsaturation according to the invention have a weight average molecular weight $\overline{Mw}$ of less than 20,000 g/mole, more particularly of between 5,000 and 18,000 g/mole, and preferably between 6,000 and 15,000 g/mole. More particularly, the polymers of the invention are (meth)acrylic polymers with linear or branched fatty chain comprising 12 to 50 carbon atoms, preferably 16 to 40 carbon atoms, more preferably 18 to 22 carbon atoms. The fatty chains may contain one or more ethylene unsaturations.

On account of their low molecular weight, the polymers of the invention have the advantage of leading to acrylic resins with high dry extract allowing low viscosity to be combined with a low content of volatile organic compounds. The polymers of the invention containing neither sulphur-containing compounds nor any metallic or halogen impurity have no major odour-related problems or problems related to colour change when in storage. They meet European regulations concerning the reduction of pollution related to the formation of sulphur oxides. They meet technical restrictions requiring the reduction of the content of metallic and halogenated impurities which may be added via additives to formulations for some applications, in particular petroleum oil applications.

A synthesis method allowing the polymers of the invention to be obtained, another subject of the invention, consists of radical polymerization in a solvent medium, applying a very rapid initiator system, more particularly according to the following operating mode:

(a) to a reactor, a starter is added consisting of the entirety of the (meth)acrylic monomer(s) either alone or optionally in solution in an organic solvent; the reaction medium is placed under agitation preferably in an inert atmosphere e.g. under nitrogen bubbling;

(b) the starter derived from step (a) is brought to the polymerization temperature;

(c) at the polymerization temperature, a continuous addition is made of a radical initiator optionally in solution in an organic solvent;

(d) the reaction medium derived from step (c) is held at the polymerization temperature for several tens of minutes;

(e) the reaction medium is cooled down to a temperature of between 50 and 60° C., preferably in an oxidizing atmosphere, preferably under agitation, at least one polymerization inhibitor is added;

(f) the polymer in solution in the organic solvent is collected, preferably after filtering the impurities present in the reaction medium.

The $C_8$ or higher, linear or branched fatty chain (meth) acrylic polymers possibly containing at least one ethylene unsaturation used in the method of the invention are in general commercially available. For example, they may be obtained by direct esterification of (meth)acrylic acid with $C_8$ or higher, linear or branched fatty chain alcohols possibly containing at least one ethylene unsaturation, or by trans-esterification of short chain (meth)acrylates with $C_8$ or higher, linear or branched fatty chain alcohols possibly containing at least one ethylene unsaturation.

More particularly, the (meth)acrylic monomers have a linear or branched chain comprising 12 to 50 carbon atoms, preferably 16 to 40 carbon atoms, more preferably 18 to 22 carbon atoms. The (meth)acrylic monomers which can be used for the method of the invention are for example n-octyl acrylate, iso-octyl acrylate, 2-ethyl hexyl acrylate, nonyl acrylate, decyl acrylate, isodecyl acrylate, undecyl acrylate, dodecyl acrylate (also known as lauryl acrylate) tridecyl acrylate, tetradecyl acrylate (also known as myristyl acrylate), pentadecyl acrylate, hexadecyl acrylate (also known as cetyl acrylate), heptadecyl acrylate, octadecyl acrylate (also known as stearyl acrylate), nonadecyl acrylate, eicosyl acrylate, behenyl acrylate and the methacrylic equivalents thereof. Mixtures of these monomers can also be used for the method of the invention, or monomers obtained by esterification or transesterification starting from mixtures of linear or branched alcohol mixtures having at least 8 carbon atoms in their chain and possibly containing at least one ethylene unsaturation. Depending on the nature of the monomer or monomers, it may be necessary for them to be heated before they are added to the reactor, if they are solid at ambient temperature.

The radical initiator or initiators (in the remainder hereof the radical initiator) used in the method of the invention for initiating the radical polymerization are generally organic peroxides and/or azo compounds. As organic peroxides, more particular mention may be made of the family of diacyl peroxides, alkyl peroxides or peresters, and mixtures thereof. Examples of organic peroxides which can be used in the method of the invention are acetyl peroxide, benzoyl peroxide, lauryl peroxide, cumyl peroxide, t-butyl peroxide, caproyl peroxide, tert-butyl peroxy-2-ethylhexanoate (also known as t-butyl peroctoate) or tert-butyl peroxybenzoate, particularly preferred, and mixtures thereof, this list not be construed as being exhaustive.

As azo compounds mention may be made of 2,2'-azobis (isobutyronitrile), 2,2'-azobis(2-methylbutyronitrile), 2,2'-azobis(2,4-dimethyl)pentanenitrile, 2,2'-azobis(4-methoxy-2,4-dimethyl)pentanenitrile, 1,1'-azobis(cyclohexane-carbonitrile), 4,4'-azobis(4-cyanovaleric acid), dimethyl-2, 2'-azobis-(2-methylpropionate), azobis(2-acetoxy-2-propane), 2,2'-azobis(2-amidinopropane)dihydrochloride, 2-(tert-butylazo)4-methoxy-2,4dimethylpentanenitrile, 2-(tert-butylazo)-2,4-dimethylpentanenitrile, 2-(tert-butylazo)isobutyronitrile, 2-(tert-butylazo)-2-methylbutanenitrile, I-(tert-amylazo)cyclohexanecarbonitrile, 1-(tert-butylazo)cyclohexanecarbonitrile, and mixtures thereof, this list not be construed as being exhaustive. Depending on the chemical nature and the kinetic decomposition characteristics of the radical initiator used, the polymerization temperature and the time of the continuous adding of the monomer mixture must be adapted to obtain the desired level of molecular weights.

The organic solvent optionally used for solubilising the radical initiator must be compatible with the organic solvent optionally used for adding of the (meth)acrylic monomer(s); it must be free of any sulphur, metallic or halogen impurity. Preferably, the same organic solvent is used for the radical initiator and for the (meth)acrylic monomer(s). As solvents which can be used, particular mention can be made of hydrocarbons and oil cuts of aliphatic and/or aromatic hydrocarbons such as hexane, cyclohexane, heptane, toluene, all the xylene isomers, Solvarex 10® (marketed by TOTAL) and its commercial equivalents, and all the solvents conventionally used for preparing solvated acrylic resins, such as ethyl acetate, methylethylketone, this list not to be considered exhaustive. More particularly, an organic solvent is used having a flash point higher than 55° C. Preferably, an oil cut is chosen that is derived from distillation, having a boiling point higher than 100° C. and a solvating power expressed according to the aniline point of more than 10° C.

The concentration of monomer(s) relative to the total weight of the reaction medium may generally reach 70% by weight, and is preferably comprised between 20 and 50% by weight. The polymerization temperature is generally comprised between 50 and 150° C., preferably between 80 and 120° C. and more preferably between 100 and 110° C. In as much as it is possible, the temperature is held constant throughout the continuous adding of the radical initiator to the reactor; the variations in temperature are preferably no more than ±3° C.

The radical initiator in solution in the organic solvent is continuously added to the reactor after first placing the monomer(s). The time over which the radical initiator is added may in general vary between 2 and 10 hours, preferably between 5 and 7 hours. The content of radical initiator is generally comprised between 2 and 14% by weight relative to the monomers, preferably comprised between 2 and 6% by weight.

According to one embodiment of the invention, the radical initiator is combined with a decomposition accelerator in solution in an organic solvent. The adding of the decomposition accelerator to the reaction medium may or may not be simultaneous with the adding of the radical initiator. The adding of the decomposition accelerator may be conducted continuously, either separately or together with the initiator. Preferably, in this embodiment, an organic peroxide is used as radical initiator which acts as oxidant and the decomposition accelerator acts as reducing agent. As decomposition accelerators mention may be made of aromatic compounds such as the aromatic amines, more particularly aromatic tertiary amines such as the derivatives of N,N'-dialkylaniline type.

More particular mention can be made of N,N'-dimethylaniline, N,N'-diethylaniline, N,N'-dimethyl-p-toluidine, or ethoxylated p-toluidines such as N,N'-bis-(2-hydroxyethyl)-p-toluidine. The organic solvent used for solubilising the accelerator is preferably the one used for the radical initiator, or any other compatible solvent.

The content of decomposition accelerator, when present, is generally comprised between 2 and 14% by weight relative to the monomers, preferably between 2 and 6% by weight. The initiator and the accelerator are more particularly used in weight ratios ranging from 1:2 to 1:0.5, and preferably range from 1:1.5 to 1:0.8.

According to one embodiment of the invention, the monomers are brought to the polymerization temperature before the radical initiator is added. For the same reasons, the reaction is conducted in an inert atmosphere to avoid the formation of peroxide radicals of lesser reactivity when the oxygen comes into contact with air.

According to one embodiment of the invention, at the end of the continuous adding of initiator, the temperature of the reaction medium is rapidly increased by 10 to 15° C. This is followed by a curing period during which, preferably at the start thereof, an addition of initiator is made of possibly up to 50% of the starting charge of initiator. During this curing period, the temperature of the reaction medium is held at the polymerization temperature in general for 1 to 3 additional hours. This curing step which possibly includes the addition of initiator, which is preferred, is intended to achieve maximum conversion for the purposes of minimizing the content of residual monomers in the final resin. The quantity of added initiator is generally comprised between 0.5 and 2% by weight relative to the monomers, preferably between 0.5 and 1%.

At the end of the reaction, the addition can be made to the reaction mixture of a stabilizer or a polymerization inhibitor to avoid possible post-polymerization of the residual monomers which could lead to a change in the mean molecular weight of the polymers during storage. As examples of polymerization inhibitor, mention may be made of the hydroquinones, such as methyl hydroquinone for example (MMEHQ). The method according to the invention has the advantage of leading to polymers with low molecular weights $\overline{Mw}$, typically less than 20,000 g/mol, which are difficult to access using conventional techniques; it uses low polymerization temperatures and does not use any sulphur-containing transfer agents which have the advantage of producing low levels of residual monomers, in general the residual monomers do not represent more than 10% of the total weight of the added monomers.

The $C_8$ or higher, linear or branched fatty chain (meth)acrylic polymers possibly containing at least one ethylene unsaturation, of low molecular weight, free of sulphur-containing, metallic or halogenated compounds, and containing less than 10% preferably less than 7% by weight of residual monomers, find particular use as additives in formulations which can be used in different application sectors such as solvated acrylic resins with high dry extract, or additives for oil products in particular fuels and lubricants. The solvated acrylic resins with high dry extract are notably used in the field of coatings, in particular in paints for motor vehicles.

The present invention concerns the use of copolymers to improve the activity of conventional cold operability additives and filterability additives with regard to the Limit Filterability Temperature (LFT) of middle distillates. The (meth)acrylic polymer or polymers of the invention such as defined in the foregoing are added to middle distillates with the cold operability additive. In the meaning of the present invention, the conventional filterability additives are copolymers containing units derived from at least one alpha-olefin, at least one vinyl ester and/or at least one ester of alpha-beta unsaturated mono-carboxylic acid; as an example mention may be made of the ethylene and vinyl acetate copolymers (EVAs), the copolymers of ethylene and vinyl propionate, the copolymers of ethylene and alkyl(meth)acrylate(s), the terpolymers of ethylene, vinyl ester and alkyl(meth)acrylate; preferably the copolymers and terpolymers comprise from 20 to 40% by weight of vinyl and/or acrylic ester recurring units.

According to one preferred embodiment, the filterability additives are EVAs. According to one preferred embodiment, the filterability additives are copolymers of ethylene and methyl acrylate. According to one preferred embodiment, the filterability additives are copolymers of ethylene and vinyl 2-ethyl hexanoate. According to one preferred embodiment, the filterability additives are terpolymers of ethylene, vinyl acetate and vinyl neodecanoate. According to one preferred embodiment, the filterability additives are terpolymers of ethylene, vinyl acetate and vinyl neodecanoate. According to one preferred embodiment, the filterability additives are terpolymers of ethylene, vinyl acetate and vinyl 2-ethyl hexanoate.

The filterability additives are statistical copolymers and have a weight average molecular weight of $\overline{Mw}$ measured using GPC generally comprised between 3,000 and 30,000 g/mole, and a number average molecular weight (Mn) measured using GPC generally comprised between 1,000 and 15,000. These copolymers may be prepared in manner known per se using any polymerization method (see for example Ullmann's Encyclopaedia of Industrial Chemistry, $5^{ème}$ Edition, "Waxes", Vol. A 28, p. 146; U.S. Pat. No. 3,627,838; EP 7 590) in particular by radical polymerization, preferably under high pressure, typically of the order of 1,000 to 3,000 bars (100 to 300 MPa), preferably from 1,500 to 2,000 bars (150 to 200 MPa), the reaction temperatures generally ranging from 160 to 320° C., preferably from 200 to 280° C., and in the presence of at least one radical initiator generally chosen from among organic peroxides and/or oxygenated or nitrogenous compounds, and of a molecular weight regulator (ketone or aliphatic aldehyde, . . . ). The copolymers may be prepared for example in a tubular reactor following the method described in U.S. Pat. No. 6,509,424.

The hydrocarbon-based compositions in which the copolymers of the invention are incorporated are chosen from among all types of fuel oils or fuels, such as diesel fuels, fuel oil domestic (FOD) for heating settings, kerosene, aviation fuel oils, heavy fuel oils, etc. In general the sulphur content of the hydrocarbon compositions is less than 5,000 ppm, preferably less than 500 ppm, more preferably less than 50 ppm, and most preferably less than 10 ppm, and advantageously they are sulphur-free.

The hydrocarbon-based compositions comprise middle distillates with a boiling point comprised between 100 and 500° C.; their crystallization onset temperature COT measured using differential scanning calorimetry is often equal to or higher than −20° C., in general it is comprised between −15° C. and +10° C. These distillates may be chosen for example from among the distillates obtained by direct distillation of crude hydrocarbons, vacuum distillates, hydrotreated distillates, distillates resulting from catalytic cracking and/or hydrocracking of vacuum distillates, distillates resulting from conversion processes of ARDS type (atmospheric residue desulphurization) and/or from visco-reduction, the distillates derived from the upgrading of Fischer Tropsch fractions, distillates resulting from BTL conversion (biomass to liquid) of plant and/or animal biomass, taken alone or in combination, and/or the esters of vegetable and animal oils or mixtures thereof.

The hydrocarbon compositions may also contain distillates originating from more complex refining operations than those derived from the direct distillation of hydrocarbons, which may for example derive from cracking, hydrocracking and/or catalytic cracking processes and visco-reducing processes. They may also contain new sources of distillates amongst which special mention may be made of:

the heaviest fractions derived from cracking and visco-reducing processes which have high heavy paraffin concentrations, comprising more than 18 carbon atoms, synthetic distillates derived from the conversion of gases such as those derived from the Fischer Tropsch process, synthetic distillates resulting from the treatment of biomass of plant and/or animal origin, such as NexBTL in particular, and the oils and/or esters of vegetable and/or animal oils, or biodiesels of animal and/or plant origin.

These new fuel bases may be used alone or in a mixture with conventional petroleum middle distillates as fuel base and/or fuel oil domestic base; they generally comprise long paraffin chains with a number of carbon atoms equal to or higher than 10, and preferably ranging from $C_{14}$ to $C_{30}$. Preferably, the hydrocarbon-based compositions are middle hydrocarbon distillates with a crystallization onset temperature COT equal to or higher than $-5°$ C., and advantageously ranging from $-5$ to $+10°$ C.

According to one preferred embodiment, the hydrocarbon distillate has a weight content of n-paraffins, with at least 18 carbon atoms, equal to or higher than 4%. According to one preferred embodiment, the hydrocarbon distillate has a weight content of n-paraffins, with at least 24 carbon atoms, equal to or higher than 0.7%, and advantageously a weight content of $C_{24}$-$C_{40}$ n-paraffins ranging from 0.7 to 2%.

A further subject of the invention concerns a fuel for diesel engines, comprising a major portion of hydrocarbon distillates such as defined previously, and in general comprising from 0 to 500 ppm of sulphur, and a minor portion of at least one filterability additive and at least one efficiency-enhancing additive according to the invention such as defined previously. A further subject of the invention concerns a heating fuel oil comprising a major portion of hydrocarbon distillates such as defined previously, and in general comprising from 0 to 5,000 ppm of sulphur, and a minor portion of at least one filterability additive and at least one efficiency-enhancing additive according to the invention such as defined previously. A further subject of the invention concerns a heavy fuel oil comprising a major portion of hydrocarbon distillates such as defined previously and in general comprising from 0 to 5,000 ppm of sulphur and a minor portion of at least one filterability additive and at least one efficiency-enhancing additive according to the invention such as defined previously. This heavy fuel oil may be used as fuel, in particular in marine engines and industrial boilers.

The cold operability additives and filterability efficiency-enhancing additives are preferably used in the form of compositions comprising in general from 85 to 98% by weight of at least one filterability additive, and from 2 to 15% by weight of at least one (meth)acrylic polymer such as defined previously as filterability indicator(s) of the filterability additive(s). This composition is prepared for example by mixing at ambient temperature the filterability additive(s) optionally in solution, and the filterability efficiency-enhancing additives optionally in solution. It can be added to the fuels at the refinery and/or can be incorporated downstream of the refinery, optionally in a mixture with other additives in the form of an additive package. In general, the composition comprising filterability additive(s) and filterability efficiency-enhancing additive(s) is added to the hydrocarbon-based compositions in a quantity ranging from 100 to 1,000 ppm by weight.

In addition to the cold operability additives or filterability additives described above and the filterability efficiency-enhancing additives according to the invention, the hydrocarbon-based compositions may also contain one or more other additives different from the copolymers of the invention, chosen from among detergents, anti-corrosion agents, dispersants, de-emulsifiers, anti-foam agents, biocides, reodorants, cetane number improving additives, friction modifiers, lubricating additives or smoothing additives, combustion-assisting agents (catalytic combustion and soot promoters), agents improving the cloud point, the pour point, the limit filterability temperature, anti-sedimentation agents, anti-wear agents and/or agents modifying conductivity. Amongst these additives particular mention may be made of:

a) cetane number improving additives, in particular (but not limited to) chosen from among alkyl nitrates, preferably 2-ethyl hexyl nitrate, aroyl peroxides, preferably benzyl peroxide, and alkyl peroxides preferably ter-butyl peroxide.

b) anti-foaming additives in particular (but not limited thereto) chosen from among the polysiloxanes, oxyalkylated polysiloxanes, and the amides of fatty acids derived from vegetable or animal oils. Examples of such additives are given in EP 861 882, EP 663 000, EP 736 590.

c) detergent and/or anti-corrosion additives in particular (but not limited thereto) chosen from among the group comprising amines, succinimides, alkenylsuccinimides, polyalkylamines, polyalkyl polyamines and polyetheramines. Examples of such additives are given in EP 938 535.

d) lubricating additives or anti-wear additives, in particular (but not limited thereto) chosen from the group comprising fatty acids and their ester or amide derivatives, in particular glycerol monooleate, and the derivatives of mono- and polycyclic carboxylic acids. Examples of such additives are given in the following documents: EP 680 506, EP 860 494, WO 98/04656, EP 915 944, FR 2 772 783, FR 2 772 784.

e) cloud point additives, in particular (but not limited thereto) chosen from the group comprising the long chain olefin/(meth)acrylic ester/maleimide terpolymers and the polymers of the esters of fumaric acid/maleic acid. Examples of such additives are given in EP 71 513, EP 100 248, FR 2 528 051, FR 2 528 423, EP 112 195, EP 172 758, EP 271 385, EP 291 367.

f) anti-sedimentation additives and/or paraffin dispersants, in particular (but not limited thereto) chosen from the group comprising the copolymers of (meth)acrylic acid/polyamine amidified alkyl (meth)acrylate, the polyamine alkenylsuccinimides, the derivatives of phtalamic acid and double-chain fatty amines; alkyl phenol resins. Examples of such additives are given in EP 261 959, EP 593 331, EP 674 689, EP 327 423, EP 512 889, EP 832 172; U.S. Patent Publication No. 2005/0223631; U.S. Pat. No. 5,998,530; WO 93/14178.

g) cold-operability multi-functional additives chosen from the group comprising olefin and alkenyl nitrate-based polymers such as described in EP 573 490.

h) biocides.

i) additives improving conductivity.

j) additives improving combustion.

k) reodorant additives.

These other additives are generally added in a quantity ranging from 100 to 1,000 ppm by weight (each) in the hydrocarbon-based compositions.

In the examples given below to illustrate the present invention without, however, limiting the scope thereof, the following characterization techniques were used:

kinematic viscosity at 40° C., measured using a Walter Herzog capillary viscometer as per standard NF EN ISO 3104, and expressed in mm²/s.

weight average molecular weights ($\overline{Mw}$) expressed in PMMA equivalents [poly(methyl methacrylate)] in g/mole and determined by Gel Permeation Chromatography (GPC) using a Waters chromatograph equipped with 5 Waters columns in series of reference HR 4+3+2+1+0.5, and using THF as eluent; preparation of the samples diluted to 0.5% in THF and elution at a rate of 1 ml/min; detection by refractometry.

residual monomer content measured by Gel Permeation Chromatography (GPC)

Limit Filterability Temperature (LFT) measured as per standard NF EN 116 pour point (PP) measured as per standard NF T 60 105 cloud point (CP) measured as per standard NF EN 23 015 aromatic content measured as per standard IP391

Crystallization Onset Temperature (COT) measured using DSC distillation temperature measured as per standard D 86 cetane number measured as per standard ASTM D4737 density at 40° C. (D40) and at 15° C. (D15) NF EN ISO 12185

The following compounds were used:

$C_{18}$-$C_{22}$ alkyl acrylates (melting point: 40° C.; molecular weight: 352 g/mol) marketed by Arkema France under the trade name Norsocryl® A18-22;

$C_{18}$-$C_{22}$ alkyl acrylates comprising from 42 to 46% by weight of behenyl acrylate ($C_{22}$), from 40 to 44% of $C_{18}$ acrylate, from 9 to 13% of $C_{20}$ acrylate, up to 1.5% of $C_{16-}$ acrylate, up to 2% of $C_{22+}$ acrylate marketed by Cognis under the trade name 45% Benhenyl Acrylate;

tert-butyl peroxybenzoate marketed by Arkema France under the trade name LUPEROX® P;

tert-butyl peroxy-2-ethyl hexanoate marketed by Arkema France under the trade name LUPEROX® 26;

decomposition accelerator: N,N'-dimethyl-p-toluidine (NNDPT) marketed by Akzo Nobel under the trade name Accelerator® NL-65-100 or by Cognis under the trade name: Bisomer® PTE;

organic solvent: aromatic solvent marketed by Exxon Mobil under the trade name Solvesso 150 (S150);

polymerization inhibitor: monomethyl ether hydroquinone (MMEHQ).

Example 1

To a 200 L polymerization reactor previously degassed with nitrogen and placed under a nitrogen atmosphere, the starter was added consisting of 294.7 parts by weight of 45% behenyl acrylate previously melted in an oven at 70° C., and 631.2 parts by weight of Solvesso 150. The starter was placed under agitation (U-shaped anchor-type agitator; agitation speed: 75 rpm) under slight nitrogen bubbling (1 m³/h) and then brought at a temperature of 100° C.

Once the polymerization temperature or set-point had been reached in the starter, the continuous addition was set in operation using a metering pump of a solution comprising 12.7 parts by weight tert-butyl peroxybenzoate (radical initiator), 61.3 parts by weight of the Solvesso 150 aromatic solvent, for a time of 6h30 under agitation. Throughout the addition, the temperature was held at 100° C.±2° C.

Once the addition was completed, curing was conducted for 1 h at the set temperature with maintained stirring.

The reaction medium was then cooled down to 60° C. under maintained stirring; the nitrogen bubbling was then stopped and 0.1 part by weight of MMEHQ was added; stirring was maintained for 15 min.

In this manner a $C_{18}$-$C_{22}$ polyacrylate was obtained in solution in Solvesso 150 whose characteristics are: Dry extract: 30%; $\overline{Mw}$: 9.540 g/mole; residual monomer content: 6.7% by weight; viscosity at 40° C.: 5.99 mm²/s.

Example 2

Example 1 was reproduced but by combining a decomposition accelerator (NNDPT) with the radical initiator. The decomposition accelerator was added continuously at the same time as the organic solution of initiator, to the proportion of 4 parts by weight.

Example 3

Example 1 was reproduced but by replacing tert-butyl peroxybenzoate by tert-butyl peroxy-2 ethyl hexanoate in the same molar proportions.

Example 4

Example 3 was reproduced but by combining a decomposition accelerator (NNDPT) with the radical initiator. The decomposition accelerator was added continuously at the same time as the organic solution of initiator to the proportion of 4 parts by weight.

Examples 5 and 6

Comparative in Accordance with WO 2008/006998

To a polymerization reactor previously degassed with nitrogen and placed under a nitrogen atmosphere, the starter was added consisting of 75 parts by weight of Solvesso 150 and 4 parts by weight of Luperox® 26. The starter was brought to 100° C. under stirring (U-shaped anchor-type agitator).

Norsocryl® A18-22 was previously melted in an oven at 70° C. Next, under stirring, a solution A was prepared consisting of 153.5 parts by weight of Solvesso 150 and 100 parts by weight of molten Norsocryl® A 18-22. A second solution denoted B was prepared from 4 parts by weight of Accelerator® NL-65-100 and 35 parts of Solvesso 150. Once the set temperature had been reached in the starter, the simultaneous but separated adding of solutions A and B was set in operation over a time of 6h30 and under stirring.

Throughout the addition, the set temperature was held at 100° C.±2° C. Once the addition was completed, curing was conducted for 1 h at the set temperature after adding 0.5 part by weight of Luperox® 26 previously dissolved in 5 parts of Solvesso 150. The reactor was then cooled and the resin stabilized with the addition of 100 ppm of MMEHQ.

All the characteristics of the polymers in Examples 1 to 6 denoted Bi are grouped together in Table 1.

TABLE 1

| Example | $\overline{Mw}$ | Residual monomer content (weight %) | Viscosity at 40° C. (mm²/s) |
|---|---|---|---|
| B1 | 10,420 | 6.64 | 7.24 |
| B2 | 10,420 | 14.04 | 5.986 |
| B3 | 9,220 | 6.36 | 7.24 |
| B4 | 9,910 | 6.64 | 6.75 |

TABLE 1-continued

| Example | $\overline{Mw}$ | Residual monomer content (weight %) | Viscosity at 40° C. (mm²/s) |
|---|---|---|---|
| B5 | 8,780 | 20.76 | 4.316 |
| B6 | 8,900 | 18.73 | 4.094 |

Example 7

In this example the efficiency was measured and compared of the improved limit filterability temperature LFT provided by the Bi polymers in Examples 1 to 6 when added to fuel oil of fuel oil domestic type. The characteristics of the distillate tested without filterability additive and without a filterability efficiency-enhancing additive are grouped together in Table 2 below.

TABLE 2

| Tested distillate of fuel oil domestic type (FOD) | |
|---|---|
| Total n-paraffins by LC/GC (weight %) of which: | 11.08 |
| $<C_{13}$ | 1.77 |
| $C_{13}$-$C_{17}$ | 4.2 |
| $C_{18}$-$C_{23}$ | 4.31 |
| $>C24$ | 0.8 |
| Limit Filterability Temperature LFT (° C.) | 0 |
| Pour point PP (° C.) | |
| Cloud point CP (° C.) | 0 |
| D15 (kg/m³) | 863 |
| Sulphur content (ppm) | 1240 |
| Aromatic content | |
| Mono Aromatics weight % | 27.6 |
| Di Aromatics weight % | 8.2 |
| Poly Aromatics weight % | 3.3 |
| Crystallization Onset Temperature COT (° C.) | −1.2 |
| Distillation (° C.) | |
| Initial Point | 162.6 |
| T10 | 195.5 |
| T20 | 220.7 |
| T50 | 293.6 |
| T80 | 341 |
| T90 | 357 |
| T95 | 372 |
| End Point | 382.8 |

The tested LFT additives were a mixture of 2 EVA copolymers (EVA1+EVA2) with a weight ratio of 15:85 then diluted with an aromatic solvent of Solvesso 150 or Solvarex 10 type with a (EVA1+EVA2)/solvent ratio of: 70:30.

EVA1 contained 71.5% by weight of ethylene and 28.5% by weight of vinyl acetate; EVA2 contained 69.5% by weight of ethylene and 30.5% by weight of vinyl acetate. The $\overline{Mw}$ of these EVAs was 5,000 and 9,000 g/mole respectively and their viscosity at 100° C. was 0.3 and 0.4 Pa·s⁻¹ respectively.

The LFT of the fuel to which an LFT additive was added was compared with the LFT of fuel containing an LFT additive plus a Bi efficiency-enhancing additive, for variable quantities of LFT alone and for the LFT additive plus efficiency-enhancing additive expressed in ppm by weight.

The results are grouped together in Table 3.

TABLE 3

| | LFT Efficiency (° C.) | | | |
|---|---|---|---|---|
| Enhancer of the example | Dosage of additive in FOD (ppm by weight) Composition of additive formulations (EVA1/EVA2/Bi/solvant) | 0 | 200 | 300 |
| — | EVA1/EVA2/S150 (10.5/59.5/0/30) | 1 | 4 | 3 |
| 1 | EVA1/EVA2//S150//B1 (9.5/53.5/3/34) | 1 | −5 | −7 |
| 2 | EVA1/EVA2//S150//B2 (9.5/53.5/3/34) | 1 | −3 | −7 |
| 3 | EVA1/EVA2//S150//B3 (9.5/53.5/3/34) | 1 | −5 | −7 |
| 4 | EVA1/EVA2//S150//B4 (9.5/53.5/3/34) | 1 | −5 | −7 |
| 5 comparative | EVA1/EVA2//S150//B5 (9.5/53.5/3/34) | 1 | 1 | −6 |
| 6 comparative | EVA1/EVA2//S150//B6 (9.5/53.5/3/34) | 1 | 0 | −7 |

Example 8

In this example the efficiency was measured and compared of the improvement in LFT contributed by the Bi polymers in Examples 1 to 6 when added to a fuel of diesel engine type. The characteristics of the distillate tested with neither a filterability additive nor an efficiency enhancer are grouped together in Table 4 below.

TABLE 4

| Tested distillate of diesel engine fuel type (DEF) | |
|---|---|
| Total of n-paraffins by LC/GC (weight %) of which: | 30.43 |
| $<C_{13}$ | 12.47 |
| $C_{13}$-$C_{17}$ | 9.61 |
| $C_{18}$-$C_{23}$ | 5.76 |
| $>C24$ | 2.59 |
| Limit Filterability Temperature LFT (° C.) | +10 |
| Pour Point PP (° C.) | +6 |
| Cloud Point CP (° C.) | +11 |
| Crystallization Onset Temperature (° C.) | +7.3 |

The LFT additives tested were a mixture of 2 EVA copolymers (EVA1+EVA2) with a weight ratio of 15:85, then diluted with an aromatic solvent of Solvesso 150 or Solvarex 10 type with a (EVA1+EVA2)/solvent ratio of: 70:30.

EVA1 contained 71.5% by weight of ethylene and 28.5% by weight of vinyl acetate; EVA2 contained 69.5% by weight of ethylene and 30.5% by weight of vinyl acetate. The $\overline{Mw}$ of these EVAs was 5,000 and 9,000 g/mole respectively and their viscosity at 100° C. was 0.3 and 0.4 Pa·s⁻¹ respectively.

The efficiency enhancer is product B1 described above (see Table 1).

In some examples, an additive was added to improve the cloud point (CP) which was a statistical terpolymer of stearyl methacrylate, of $C_{20}$-$C_{24}$ alpha-olefin and of N-tallow maleimide (density at 15° C.: 890-930 kg/m³—Flash point: >55° C. (NF EN ISO 22719); self-ignition temperature: >about 450° C.) marketed by Total Additifs & Carburants Spéciaux under the trade name CP8327.

The LFT was compared between the fuel to which an LFT additive was added and a fuel containing an LFT additive plus a Bi efficiency enhancer, for variable quantities of LFT additive alone and for LFT additive plus efficiency enhancers expressed in ppm by weight.

The results are grouped together in Table 5.

TABLE 5

| Enhancer of the example | Dosage additive in diesel engine fuel (DEF) (ppm by weight) Composition of additive formulations (EVA1/EVA2/ . . . /solvent) | 0 | 300 | LFT gain |
|---|---|---|---|---|
| — | EVA1/EVA2/S150 (35/35/30) | 10 | 9 | 1 |
| 1 | EVA1/EVA2/B1/S150 (35/35/3/34) | 10 | 6 | 4 |
| — | EVA1/EVA2/CP/S150 (31.5/31.5/5/32) | 1 | 4 | 6 |
| 1 | EVA1/EVA2/B1/CP/S150 (23/23/3/5/36)) | 10 | 1 | 9 |

The invention claimed is:

1. A method for synthesizing $C_8$ or higher, linear or branched fatty chain alkyl polyacrylates comprising at least one ethylene unsaturation, of weight average molecular weight $\overline{Mw}$ of less than 20,000 g/mole, free of sulphur-containing metallic and halogenated compounds, by radical polymerization in solution and whose residual monomer content measured by GPC is no more than 10 by weight, wherein the method comprises:
    (a) to a reactor, a starter being added consisting of the entirety of the acrylates monomer(s) either alone or optionally in solution in an organic solvent, and the reaction medium being placed under agitation
    (b) the starter derived from step (a) being brought to the polymerization temperature;
    (c) at the polymerization temperature, a radical initiator being continuously added optionally in solution in an organic solvent;
    (d) the reaction medium derived from step (c) is held at the polymerization temperature for several tens of minutes;
    (e) the reaction medium being cooled down to a temperature of between 50 and 60° C., and at least one polymerization inhibitor being added; and
    (f) the polymer in solution in the organic solvent being collected.

2. The method according to claim 1, wherein the acrylate monomer(s) comprise a linear or branched chain comprising 12 to 50 carbon atoms.

3. The method according to claim 1, wherein the content of radical initiator is between 2 and 14% by weight relative to the monomers.

4. The method according to claim 1, wherein the radical initiator is an organic peroxide.

5. The method according to claim 1, wherein the radical initiator is combined with a decomposition accelerator in solution in an organic solvent, the said decomposition accelerator being added to the reaction medium simultaneously with the initiator or separately.

6. The method according to claim 5, wherein the decomposition accelerator is an aromatic amine derivative.

7. The method according to claim 1, wherein at step (e) the reaction medium is cooled down to a temperature of between 50 and 60° C. in an oxidizing atmosphere.

8. The method according to claim 1, wherein at step (f) the polymer in solution in the organic solvent is collected after filtering the impurities present in the reaction medium.

9. The method according to claim 1, wherein the polymers have a residual monomer content measured by GPC of less than 7% by weight.

10. The method according to claim 1, wherein the polymers have a linear or branched chain comprising from 16 to 40 carbon atoms.

11. The method according to claim 3, wherein the content of radical initiator is between 2 and 6% by weight relative to the monomers.

12. A method of synthesizing solvated acrylic resins with high dry extract comprising the addition of $C_8$ or higher, linear or branched fatty chain (meth)acrylic polymers comprising at least one ethylene unsaturation, of weight average molecular weight $\overline{Mw}$ less than 20,000 g/mole, free of sulphur-containing, metallic and halogenated compounds and with a residual monomer content measured by GPC of no more than 10% by weight said polymer being obtained by radical polymerization process in solution consisting of:
    (a) to a reactor, a starter being added consisting of the entirety of the acrylates monomer(s) either alone or optionally in solution in an organic solvent, and the reaction medium being placed under agitation;
    (b) the starter derived from step (a) being brought to the polymerization temperature;
    (c) at the polymerization temperature, a radical initiator being continuously added optionally in solution in an organic solvent;
    (d) the reaction medium derived from step (c) is held at the polymerization temperature for several tens of minutes;
    (e) the reaction medium being cooled down to a temperature of between 50 and 60° C., and at least one polymerization inhibitor being added; and
    (f) the polymer in solution in the organic solvent being collected.

13. A method of adding polymers to oil formulations such as formulations of lubricants, fuels or hydrocarbons, the method comprising adding $C_8$ or higher, linear or branched fatty chain (meth)acrylic polymers comprising at least one ethylene unsaturation, of weight average molecular weight $\overline{Mw}$ less than 20,000 g/mole, free of sulphur-containing, metallic and halogenated compounds and with a residual monomer content measured by GPC of no more than 10% by weight, said polymer being obtained by radical polymerization process comprising:
    (a) to a reactor, a starter being added consisting of the entirety of the acrylates monomer(s) either alone or optionally in solution in an organic solvent, and the reaction medium being placed under agitation
    (b) the starter derived from step (a) being brought to the polymerization temperature;
    (c) at the polymerization temperature, a radical initiator being continuously added optionally in solution in an organic solvent;
    (d) the reaction medium derived from step (c) is held at the polymerization temperature for several tens of minutes;
    (e) the reaction medium being cooled down to a temperature of between 50 and 60° C., and at least one polymerization inhibitor being added; and
    (f) the polymer in solution in the organic solvent being collected.

14. The method according to claim 13, further comprising providing hydrocarbon distillates having a boiling point of between 150 and 450° C., to enhance the efficiency of filterability additives added to the said distillates, containing co- and/or terpolymers of ethylene, $C_3$-$C_5$ carboxylic acid vinyl ester and mono-alcohol comprising 1 to 10 carbon atoms.

15. A $C_8$ or higher, linear or branched fatty chain alkyl polyacrylates possibly containing at least one ethylene unsaturation, of weight average molecular weight $\overline{Mw}$ less than 20,000 g/mole, free of sulphur-containing, metallic and halogenated compounds and with a residual monomer content measured by GPC of no more than 10% by weight, said polymers being obtained by radical polymerization process solution wherein:
- (a) to a reactor, a starter is added consisting of the entirety of the acrylate monomer(s) either alone or optionally in solution in an organic solvent; the reaction medium is placed under agitation;
- (b) the starter derived from step (a) is brought to the polymerizaiton temperature;
- (c) at the polymerization temperature, a radical initiator is continuously added optionally in solution in an organic solvent;
- (d) the reaction medium derived from step (c) is held at the polymerization temperature for several tens of minutes;
- (e) the reaction medium is cooled down to a temperature of between 50° C. and 60° C., at least one polymerization inhibitor is added; and
- (f) the polymer in solution in the organic solvent is collected.

* * * * *